(12) United States Patent
Gentner et al.

(10) Patent No.: US 6,553,934 B2
(45) Date of Patent: Apr. 29, 2003

(54) METHOD AND APPARATUS FOR MONITORING MILKING FACILITY PULSATION

(75) Inventors: Jeffrey W. Gentner, Dublin, TX (US); Martin Chandler Cooper, Stephenville, TX (US)

(73) Assignee: Senseability, Inc., Dublin, TX (US)

( * ) Notice: Subject to any disclaimer, the term of this patent is extended or adjusted under 35 U.S.C. 154(b) by 0 days.

(21) Appl. No.: 09/753,825

(22) Filed: Jan. 3, 2001

(65) Prior Publication Data

US 2002/0104484 A1 Aug. 8, 2002

(51) Int. Cl.[7] ................................................. A01K 5/00
(52) U.S. Cl. ..................................................... 119/14.02
(58) Field of Search .......................... 119/14.01, 14.02, 119/14.03, 14.08, 14.14

(56) References Cited

U.S. PATENT DOCUMENTS

| | | | | |
|---|---|---|---|---|
| 4,391,221 A | * | 7/1983 | Hoefelmayr et al. | 119/14.08 |
| 4,944,249 A | * | 7/1990 | Takeuchi et al. | 119/14.44 |
| 5,010,844 A | * | 4/1991 | Takeuchi et al. | 119/14.25 |
| 5,275,124 A | * | 1/1994 | van der Lely et al. | 119/14.08 |
| 5,584,262 A | * | 12/1996 | Schultz | 119/14.28 |
| 5,860,388 A | * | 1/1999 | Tan et al. | 119/14.44 |
| 6,152,076 A | * | 11/2000 | Laub-Maier | 119/14.08 |
| 6,257,169 B1 | * | 7/2001 | Oosterling | 119/14.02 |

OTHER PUBLICATIONS

InnovAg, 4 sheets of information of products available.
DairyTest Professional, Document No. DR54–0053–01 5 pages, InnovAg Pty. Ltd.
DairyTest Monitor, 3 sheets of information.
DairyTest Monitor, Document No. DR54–0047–07, 8 pages, InnovAg Pty. Ltd.

* cited by examiner

*Primary Examiner*—Thomas Price
(74) *Attorney, Agent, or Firm*—Geoffrey A. Mantooth

(57) ABSTRACT

A pulsator provides alternating vacuum pressure and atmospheric pressure to an elastomeric liner in a sleeve of a milking claw in a dairy barn. The purpose of pulsation is to alternate the cow teat between a milking phase and a rest phase. The invention monitors the operation of the pulsator to determine if the pulsator is operating satisfactorily. The invention records data during a calibration mode from the pulsator in normal operation. The data that is recorded is the duration of the milking phase and the rest phase and the associated pressures. During pulsator operation, the invention measures the pulsation between atmospheric and vacuum pressures provided to the milking claw and compares this measured data to the recorded calibration data. If the pulsator is not found to be operating within predetermined tolerances, then an indication of a pulsator malfunction is provided, typically in the form of a light located in the milking pen. This indicates to the milking crew that the pulsator requires attention and should not be used until properly fixed.

17 Claims, 7 Drawing Sheets

METHOD AND APPARATUS FOR MONITORING MILKING FACILITY PULSATION

FIELD OF THE INVENTION

The present invention relates to milking facilities such as found in dairy barns, and in particular to methods and apparatuses for monitoring the pulsation system of milking facilities.

BACKGROUND OF THE INVENTION

A milking facility automates the milking process of dairy animals, such as a cow. The cow is put into a pen and a milking claw is attached to the teats of the animal. The milking claw has four sleeves, one for each teat. A vacuum is applied to each sleeve in order to suck out the milk. However, a constant application of vacuum is undesirable because the teat and surrounding tissue will be damaged. A calf suckling on its mother does not apply a constant vacuum. Rather it sucks, then swallows and breathes before sucking again. Thus, the teat is put under a periodic suction or vacuum, interspersed with rests.

Automated milking facilities emulate this natural milking action by the use of a liner. The liner which is elastomeric, is located inside of a shell of the sleeve. The liner is made to expand and contract so as to control the application of vacuum or suction to an individual teat. The liner is in turn controlled by a pulsator.

The pulsation system is a vital part of a milking facility. There is usually one pulsator for every cow being milked in the barn at that time. For example, if a barn can milk sixty cows at a time, the barn would typically have sixty pulsators. The pulsation system controls the liner that actually comes in contact with the cow's teats. The liner is fitted inside the shell. The liner is usually made of rubber or silicone while the shell is usually made of stainless steel or rigid plastic. Between the liner and the shell is an airtight chamber. The pulsation system alternates the liner between a vacuum state and a massage state. During the vacuum state or milking phase, the milk is drawn out of the teat with a vacuum applied to the teat end. During the massage state or rest phase, the liner collapses on the teat and massages the teat. The relaxation of the teat during the massage state is necessary to avoid accumulation of blood and fluid in the teat end which may lead to mastitis.

Mastitis is an inflammation of the mammary gland caused by injury or much more commonly the introduction of invading bacterial pathogens that multiply in the milk producing tissues. Mastitis reduces milk yield and alters the composition of milk and in many cases injures the animal to a point where she cannot recuperate and becomes an economic loss for the dairyman.

Dairy producers lose an estimated $185 for every cow they own to mastitis. This amounts to over a billion dollars lost per year for the dairy industry as a whole according to the National Mastitis Council. Two-thirds of this loss comes from production loss of subclinically infected cows.

There are two main sub categories of mastitis; subclinical and clinical. Subclinical mastitis the form of the disease in which there is no observable indication of the disease, but the presence of bacterial pathogens can be detected in the milk by special testing. This form of the disease can be very detrimental to milk production in quality and quantity produced by the herd. Subclinical cows many times become clinical as the bacterial infection spreads.

Clinical mastitis is the form of the disease in which there is observable indications of an inflammation of the mammary gland (udder) and the milk produced may not be used for human consumption. Clinical mastitis results in a loss of the cow to milk production for some amount of time Three factors may contribute to the spread of mastitis: environment, milking procedures, and milking equipment. For the purposes of this application, this invention pertains to the last; milking equipment. It evaluates the pulsator, which is a primary component of the milking equipment.

A properly performing pulsator operates in accordance with standards. The standards determine the length of the milking phase, the rest phase and the transition periods between the milking and rest phases. Unfortunately, when a pulsator malfunctions, it usually is unable to execute the rest phase. This puts the cow's teat under a constant vacuum, potentially leading to mastitis.

In the prior art, the pulsators might be checked against these standards one time per month. The standards provide ranges for the milking phase and the rest phase. A technician "graphs" each pulsator with a portable vacuum analyzer. The technician hooks this specialized computer up to each pulsator and receives a printout analysis. The technician must then determine whether the pulsator falls within the set standards and repair the pulsators that do not perform to specifications. The technician must check each pulsator individually.

The prior art suffers from several disadvantages. The analyzer is relatively costly and can only check one pulsator at a time. Thus, a dairy barn only hires a technician on a periodic basis, often just once a month. A pulsator may be malfunctioning several weeks before its next check-up by the technician. In this time period, every cow milked by that pulsator is subject to teat end congestion and mastitis because there is not an adequate massage phase. That could be more than 2500 milkings with a malfunctioning pulsator. Just one broken pulsator over the course of a month can be devastating to a herd's health.

Another disadvantage is that the prior art analyzer requires expertise to utilize. The analyzer prints out a graph showing the pressure of the pulsator. The technician must then interpret the data to determine if the pulsator is operating properly. Consequently, many dairy barns are unable to check the pulsators with in-house personnel and have to hire the technician. This adds to the cost of maintaining the equipment. Also when the analysis is performed, the discretion as to whether a pulsator is within parameters or not is left to the whim of a technician. These parameters will be different from technician to technician and will also differ depending on a technician's state of mind.

A milking facility's pulsation system must be held constantly to high and consistent standards. The system must be checked more than once per month and the standards for a dairy should not change. The current industry practice is forgiving to a malfunctioning pulsator which can destroy a herd's health.

SUMMARY OF THE INVENTION

It is an object of the present invention to provide a method and apparatus for analyzing the pulsation system constantly against a predetermined and unchanging set of standards.

The present invention provides a method of monitoring the operation of a pulsator in a dairy barn milking system. The milking system has a milking claw with a vacuum applied to the milking claw. The pulsator produces pressure changes in the vacuum applied to the milking claw. Stored pressure changes from a normally operating pulsator are provided. The pressure changes in the vacuum that are produced by the pulsator are measured. The measured pressure changes are compared to the stored pressure changes and a determination is made if the measured pressure changes are within a predetermined tolerance of the stored pressure changes. An unsatisfactory indication is provided if the measured pressure changes are outside of the predetermined tolerances.

In accordance with one aspect of the present invention, a satisfactory indication is provided if the measured pressure changes are within the predetermined tolerance by illuminating a light of a first color in a milking pen having a milking claw, while the step of providing an unsatisfactory indication further comprises illuminating a light of a second color in the milking pen. Thus, the milking crew in the milking pen receives a visual indication of if the pulsator is operating correctly or not. In the preferred embodiment, a good indication is provided by a green light, while an unsatisfactory or bad indication is provided by a red light.

In another aspect of the present invention, the step of providing stored pressure changes from a normally operating pulsator further comprises performing a calibration mode by measuring the pressure changes of the pulsator that is to be monitored and storing those pressure changes. Thus, the method is calibrated to the particular pulsator that is being monitored. This provides a flexibility that allows the dairyman to change pulsation parameters, while maintaining tight tolerances.

In accordance with another aspect of the present invention, the pressure changes comprise a rest phase and a milking phase. The step of performing a calibration mode further comprises averaging the rest phases and averaging the milking phases and storing the averaged rest and milk phases.

In accordance with still another aspect of the present invention, the pressure changes comprise a rest phase and a milking phase. The steps of comparing and determining if the measured pressure variations are within the predetermined tolerance further comprises comparing the measured rest and milk phases to the respective stored rest and milk phases and determining if the durations and pressures are within the predetermined tolerance. The invention also provides an apparatus for monitoring the pulsation of a milking system in a dairy facility. The milking system has a vacuum line connected to a milking claw and a pulsator for altering the pressure in the vacuum line between atmospheric pressure and vacuum pressure. The apparatus has a pressure sensor that is structured and arranged to be coupled to the vacuum line. The pressure sensor provides a pressure signal. A processor has an input and an output. The input is connected to the pressure sensor so as to receive the pressure signal. The processor has a memory, with the memory containing recorded pressure variations representing the normal operation of the pulsator. The processor compares the pressure signal with recorded pressure variations and determines if the pressure signal is within a predetermined tolerance of the recorded pressure variations. If the pressure signal is within the predetermined tolerance, then the pulsator is operating satisfactorily. If the pressure signal is not within the predetermined tolerance of the recorded pressure variations, then the pulsator is not operating correctly. An output signal is provided to the output of the determined operability of the pulsator. An indicator is coupled to the output to provide an indication of the operability of the pulsator.

In accordance with another aspect of the present invention, the indicator is a light.

In accordance with another aspect of the present invention, the processor compares the milking phase and the rest phase of the measured pressure signal with the recorded milking and rest phases of the pressure variations.

In accordance with another aspect of the present invention, the pulsator alternates the pressure in the vacuum line between a rest phase and a milking phase. The rest phase and the milking phase each has a duration and a pressure. The processor compares the duration and pressure of the rest phase of the pressure signal to the duration and pressure of the rest phase of the recorded pressure variations and compares the duration and pressure of the milking phase of the pressure signal to the duration and pressure of the milking phase of the recorded pressure variations.

In accordance with another aspect of the present invention, the apparatus further comprises an adjustable tolerance setting that provides an adjustable input of the tolerance to the processor.

In accordance with another aspect of the present invention, the apparatus further comprises a calibration setting that provides an input to the processor. The processor records the recorded pressure variations from the pulsator that is being monitored when the calibration setting is selected.

DESCRIPTION OF THE PREFERRED EMBODIMENT

Figure 1:
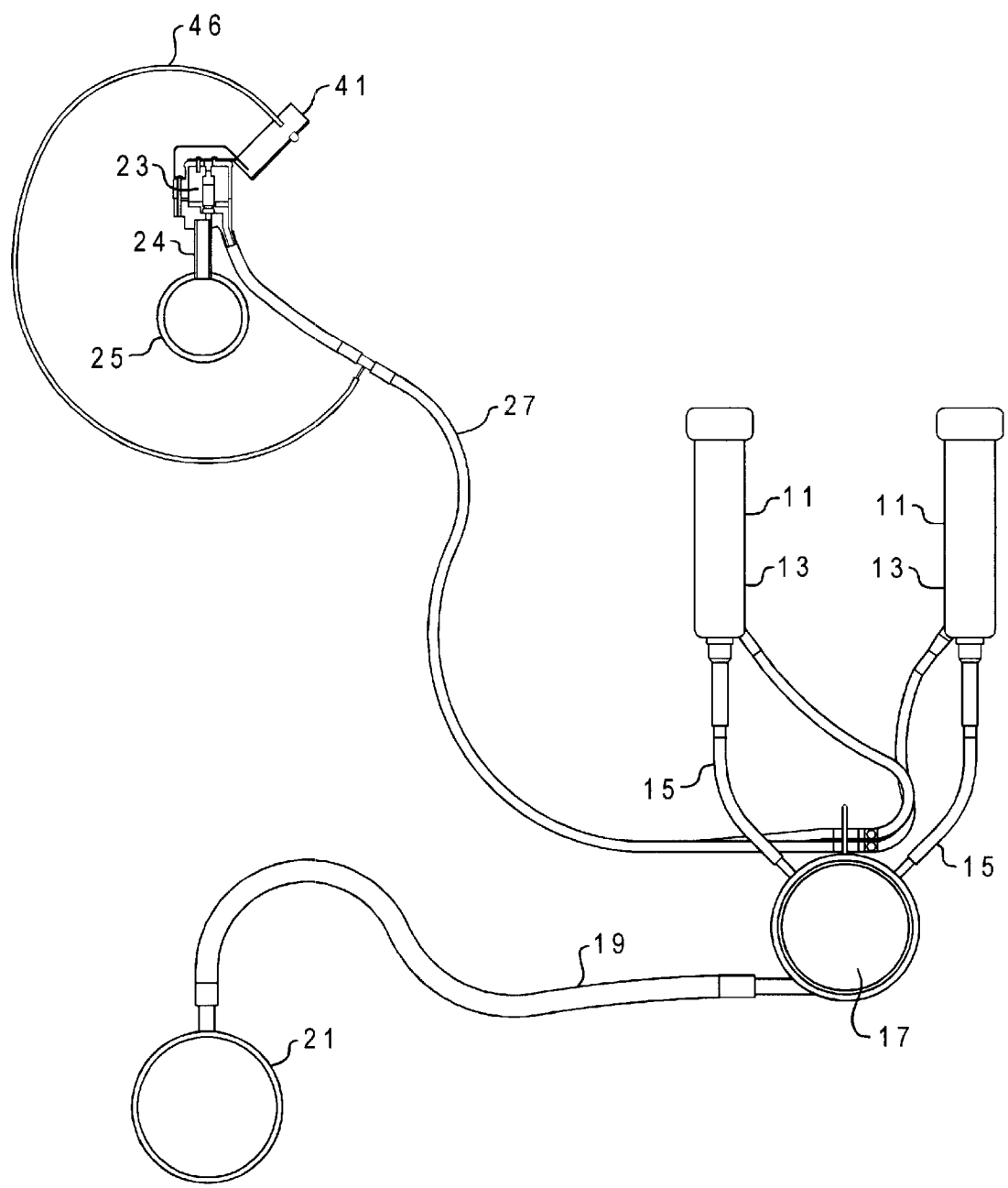
FIG. 1 is a view of milking equipment in a pen of a dairy barn, with the pipes shown in cross-section.

In FIG. 1, there is shown the portion of a milking system that is located in a milking pen. Such a system is common to dairy barns. A milking claw 11 is coupled to the teats of the cow. The milking claw has four sleeves 13, one for each teat. (Only two sleeves are shown in FIG. 1, the other two sleeves are hidden behind the sleeves that are shown.) The milk from the cow drains down the sleeves into a hose 15 and then into a manifold 17. The manifold 17 collects the milk from all four sleeves 13. The milk then enters another hose 19 and is delivered to a milk line 21. The milk line 21 slopes down through all of the milking pens on one side of the barn and into a collecting tank (not shown). A vacuum is applied to the sleeve 13 via the milk line 21. The vacuum sucks the milk out of the teat.

In order to avoid subjecting the teat to a constant vacuum, a condition that could lead to mastitis, the milk line 21 vacuum is pulsed by a pulsator 23. The pulsator 23 is coupled to a vacuum line 25 that extends through all of the milking pens on one side of the barn. A short rigid pipe 24 couples the pulsator 23 to the vacuum line 25 (See FIG. 2).

The vacuum pressure in the vacuum line 25 is the same as the vacuum pressure in the milk line 21, because a single vacuum source is used for both pipes. The pulsator 23 is connected to the sleeves 13 by a vacuum hose 27.

Pulsators 23 are conventional and commercially available. The pulsators 23 typically contains solenoids 26 which open and close valves to allow either vacuum or atmospheric pressure to be applied to the vacuum hose 27. Each pen has a pulsator 23 and each pulsator has two vacuum hoses 27 extending therefrom. There is a vacuum hose 27 provided for two sleeves 43. The front and rear sleeves, which correspond with the front and rear teats of the cow, are alternated so as to maintain the milking claw on the animal. For example, while the front sleeves are in the milking phase, the rear sleeves would be in the rest phase and vice versa.

Figure 3B:
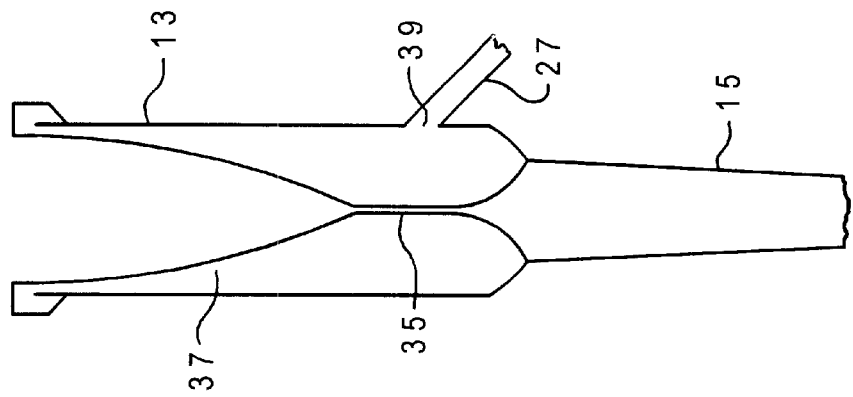
FIG. 3B is a cross-sectional view of a liner and shell, shown in the rest phase.
Figure 3A:
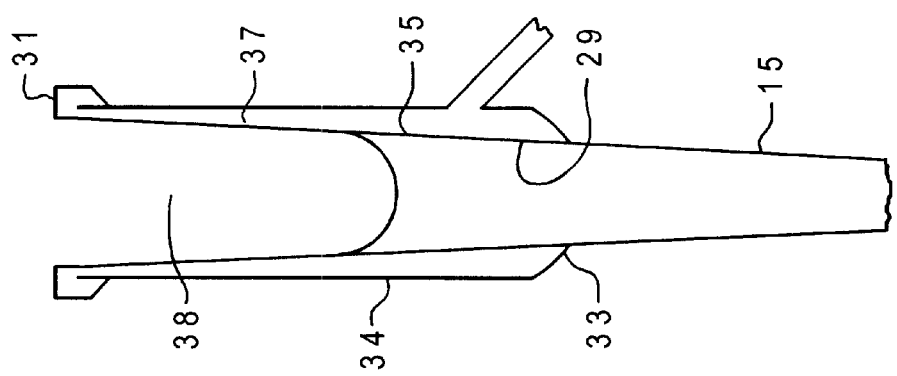
FIG. 3A is a cross-sectional view of a liner and shell, shown in the milking phase.

As shown in FIGS. 3A and 3B, the sleeve 13 has a rigid shell 34 that is rigid (typically made of stainless steel or rigid plastic). Inside the shell 34 is an elastomeric liner 35. A channel 29 extends from the upper end 31 of the sleeve (the end that attaches to the teat) to the lower end 33. The channel communicates with the hose 15. Surrounding the channel 29 is the liner 35. Between the liner 35 and the sleeve 13 is an annulus 37, which has a port 39. The annulus 37 is connected to the vacuum hose 27.

The pulsator 23 alternates pressure in the annulus 37 between a vacuum and atmospheric pressure. During the milking phase, as shown in FIG. 3A, the liner is relaxed because the pressure differential across the liner 35 is zero. Thus, in the milking phase, a vacuum is applied to the annulus 37. The teat 38 is subjected to the vacuum from the hose 15 and milk flows from the cow.

In the rest phase, shown in FIG. 3B, the pulsator 23 changes the pressure in the annulus 37 to atmospheric pressure. This causes the liner 35 to distort, closing off the suction and allowing the teat to rest. No milk is produced during the rest phase.

The pulsation system will pulsate normally from fifty to sixty-five times per minute. This setting is controlled by a pulsation controller or on the pulsator itself. A second setting is the ratio. The ratio is the distribution of the pulsation cycle between the vacuum state (milk) and the massage state (rest). A typical ratio setting is from a fifty percent milk and fifty percent rest to a seventy percent milk and a thirty percent rest. It is important that these settings be consistent.

Being creatures of habit, the cows need a consistent pulsation system to encourage the milk let down reflex. If there is a change in these settings, the cows may not let their milk down properly causing a loss of production and an increased chance of subclinical and clinical mastitis. The rate and the ratio should remain consistent.

Even if the rate and the ratio settings are consistent at a predetermined amount, this does not mean that a pulsator is working within the set parameters. The pulsator needs to execute those states at a certain standard. It should take a certain amount of time to remove the atmospheric air from the chamber to begin the milk state. On the other hand, it should take a certain amount of time to replace the atmospheric air to the chamber to begin the rest state. If either of these transition states is too slow, every cow that is milked by that pulsator has an increased chance of contracting mastitis.

For a specific example, assume that a milking facility has set the pulsation controller to execute sixty pulsations per minute. This dictates that one pulsation will last one second or 1000 milliseconds. That gives the pulsator 1000 milliseconds to execute two states, the milk state and the rest state. Assume that this milking facility's pulsation controller is set at a sixty percent milk ratio and a forty percent rest ratio. This dictates that the milk portion will last 600 milliseconds and the rest portion will last 400 milliseconds.

Figure 4:
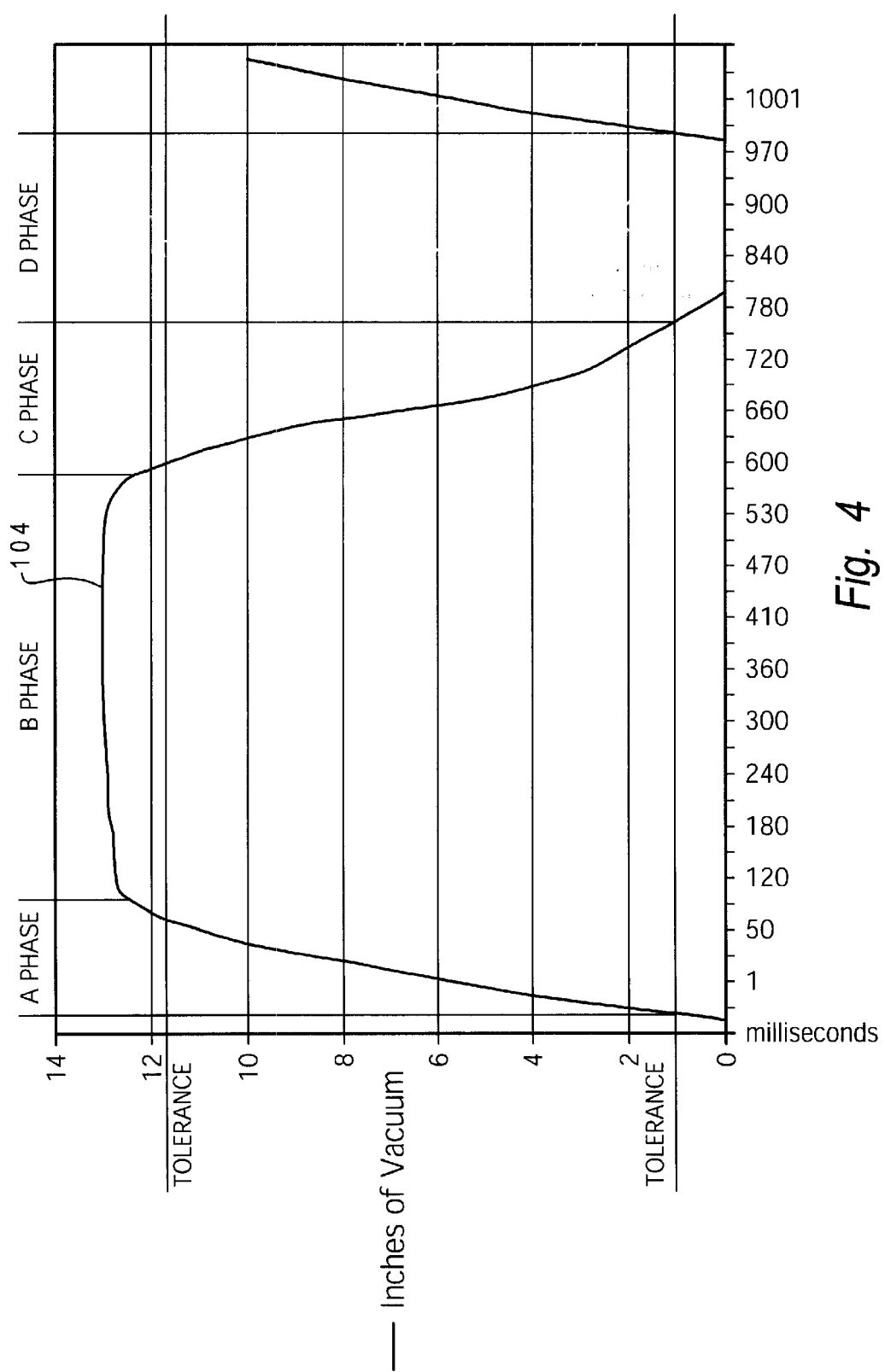
FIG. 4 is a graph of a typical pulsator cycle.

Referring to FIG. 4, during the 600 milliseconds of the milk portion, the pulsator must perform two phases. It must first remove the atmospheric air (A phase) and second it must maintain a vacuum (B phase) for the remainder of the 600 milliseconds. The duration the cow has during one pulsation to give her milk is dictated by the execution of the A phase. For example, if the A phase takes 100 milliseconds to remove the atmospheric air, the cow will have 500 milliseconds to give her milk. If the A phase takes 400 milliseconds to remove the atmospheric air, the B phase will only last 200 milliseconds.

With this short of a B phase, a cow will either take a long time to give her milk or perhaps worse be milked out incompletely. A complete milkout in effect flushes bacteria that may have gained entry into the mammary system back out of the mammary system. An incomplete milkout on the other hand increases the likely hood of bacteria gaining a foothold in the mammary system, elevating the possibility of infection. In addition, the longer the milking machine is attached to the cow the greater the chance of bacterial infection from the milking equipment.

In the same example, the rest portion has 400 milliseconds to execute. The pulsator must perform two phases during this time. It must first replace the atmospheric air (C phase) and second it must maintain atmospheric pressure (D phase) for the remainder of the 400 milliseconds. The duration the cow has for her rest phase or massage phase is dictated by the execution of the C phase. For example, if the C phase takes 100 milliseconds to replace the atmospheric air, the cow will have 300 milliseconds to receive a massage and remove any teat end congestion. Although if the C phase takes 300 milliseconds to replace the atmospheric air, the D phase will only last 100 milliseconds.

With this short of a D phase, there is an increased chance a cow will develop teat end congestion, which may also lead to mastitis or teat end trauma to the fragile tissue at the tip of the teat. This tissue trauma can also lead to mastitis by harboring large quantities of bacteria in the cracks of the damaged skin right at the entrance of the teat canal. Industry standards dictate that the D phase needs to last at least 200 milliseconds. While this pulsator is malfunctioning, every cow that is milked by this pulsator is at increased risk to mastitis. It is vital that every pulsator in the milking facility is working within a predetermined set of standards.

In the same example, these standards could be as follows:

| | |
|---|---|
| Rate: | 59–61 pulsations per minute |
| Milk Portion: | 59–61 percent |
| Rest Portion: | 39–41 percent |
| A phase: | 90–130 milliseconds |
| B phase: | 480–510 milliseconds |
| C phase: | 100–160 milliseconds |
| D phase: | 200–260 milliseconds |
| B phase vacuum: | >13.0" of mercury |
| D phase vacuum: | <.3" of mercury |

The apparatus 41 of the present invention monitors the operation of the pulsator 23. The apparatus 41 checks the duration of the phases (in particular, the duration of the B and D phases) and also the pressure during those phases and provides an indication if the pulsator is operating improperly.

Figure 2:
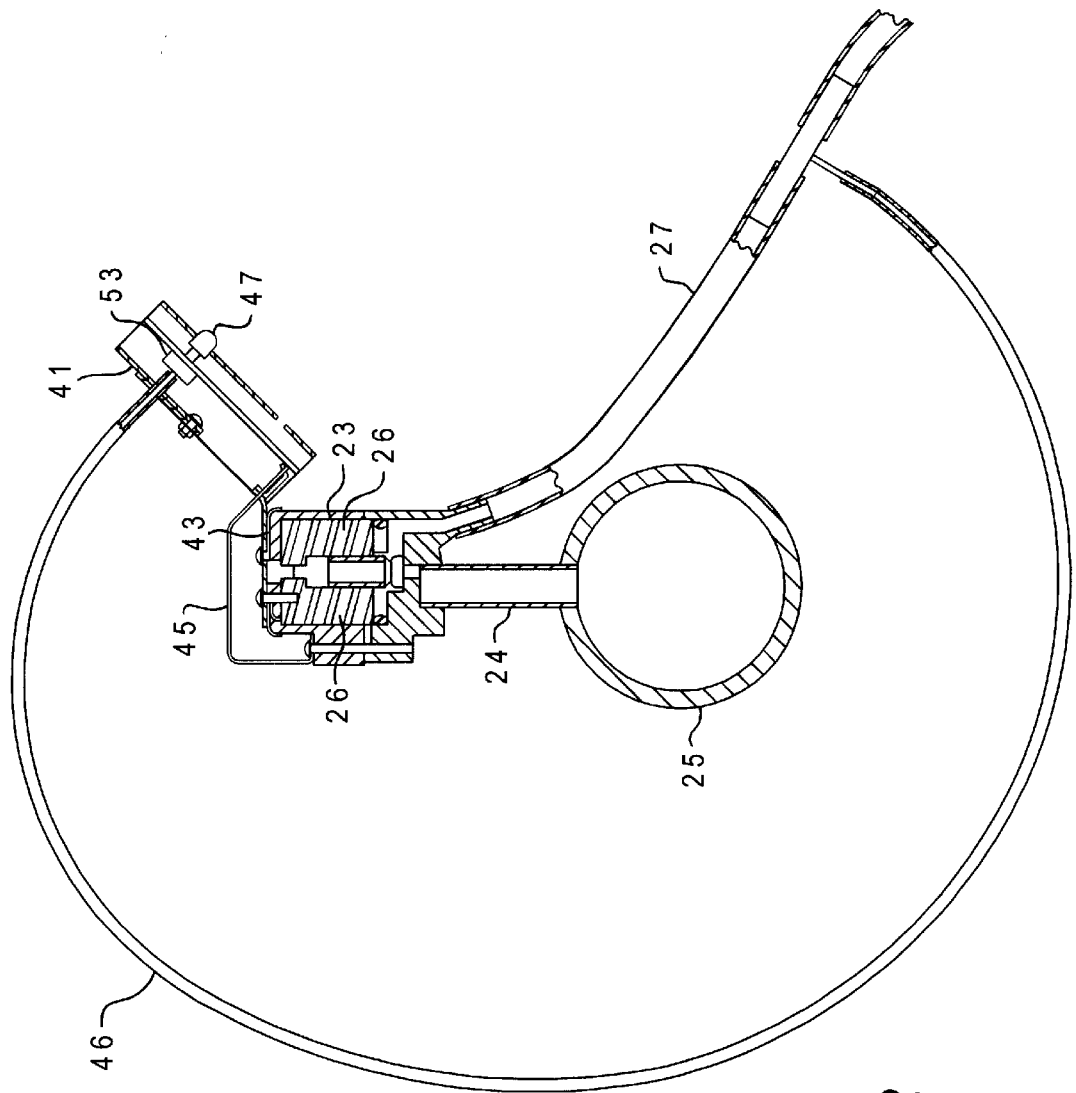
FIG. 2 is a close up view of the pulsator, equipped with the apparatus of the present invention, in accordance with a preferred embodiment.

Each pulsator 23 is equipped with an apparatus 41 of the present invention. As shown in FIG. 2, the apparatus 41, which is contained in a housing or case, can be mounted to the pulsator 23 by the use of a bracket 43. The apparatus 41 utilizes the same power supply as the pulsator. A wire 45 connects the apparatus to the power supply terminals on the pulsator 23. A hose 46 connects the apparatus 41 to the vacuum hose 27. A "T" junction can be used.

Figure 5:
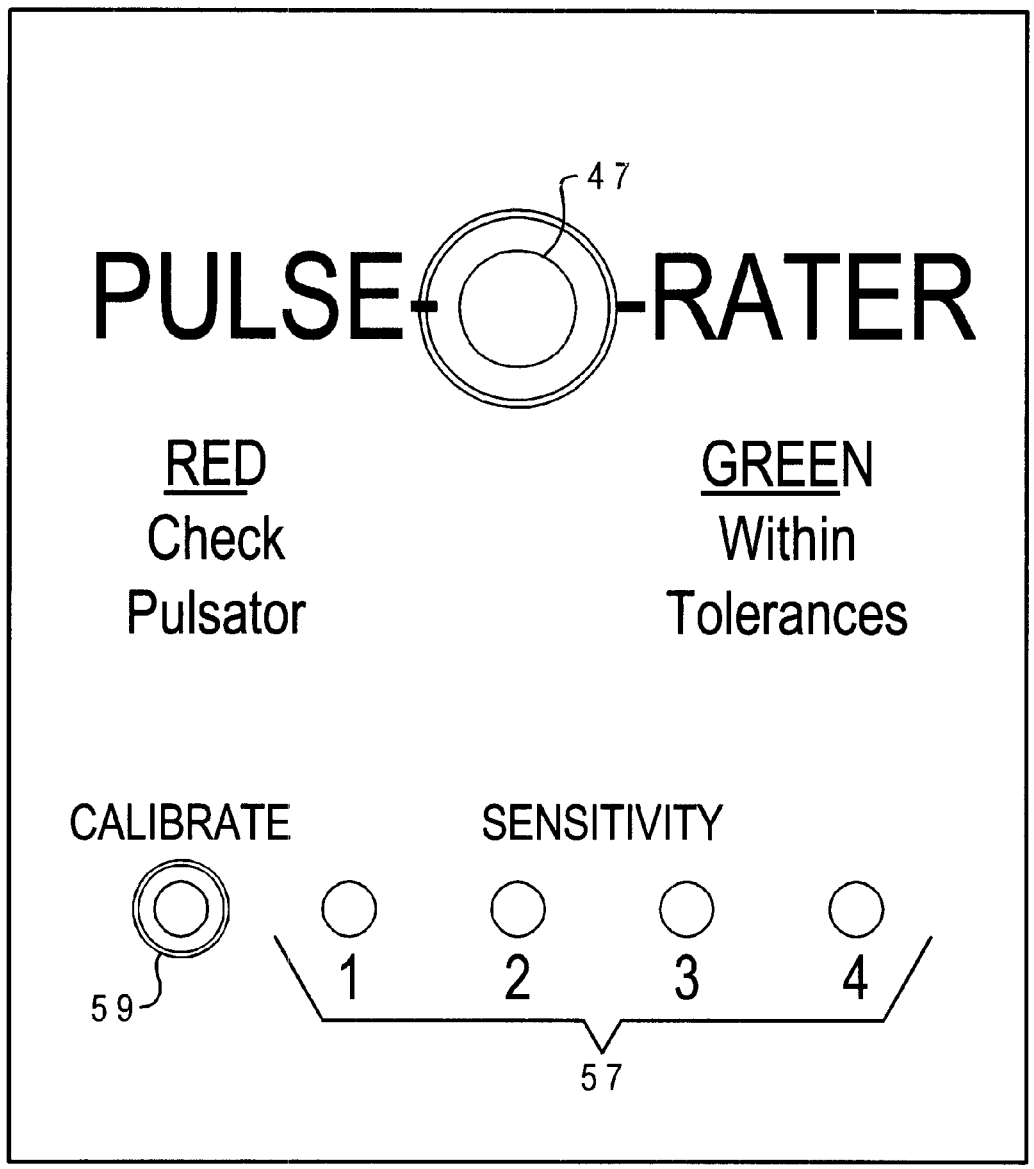
FIG. 5 is a front view of the apparatus.

FIG. 5 shows the front face of the apparatus 41. An indicator light 47 is provided. In the preferred embodiment, the indicator light can illuminate in two colors, namely red and green. The front face also has a push button 59 to alternate between the calibrate and acquire mode and also push buttons 57 for setting tolerances. The functions of these push buttons will be described in more detail below with reference to the method of the invention.

Figure 6:
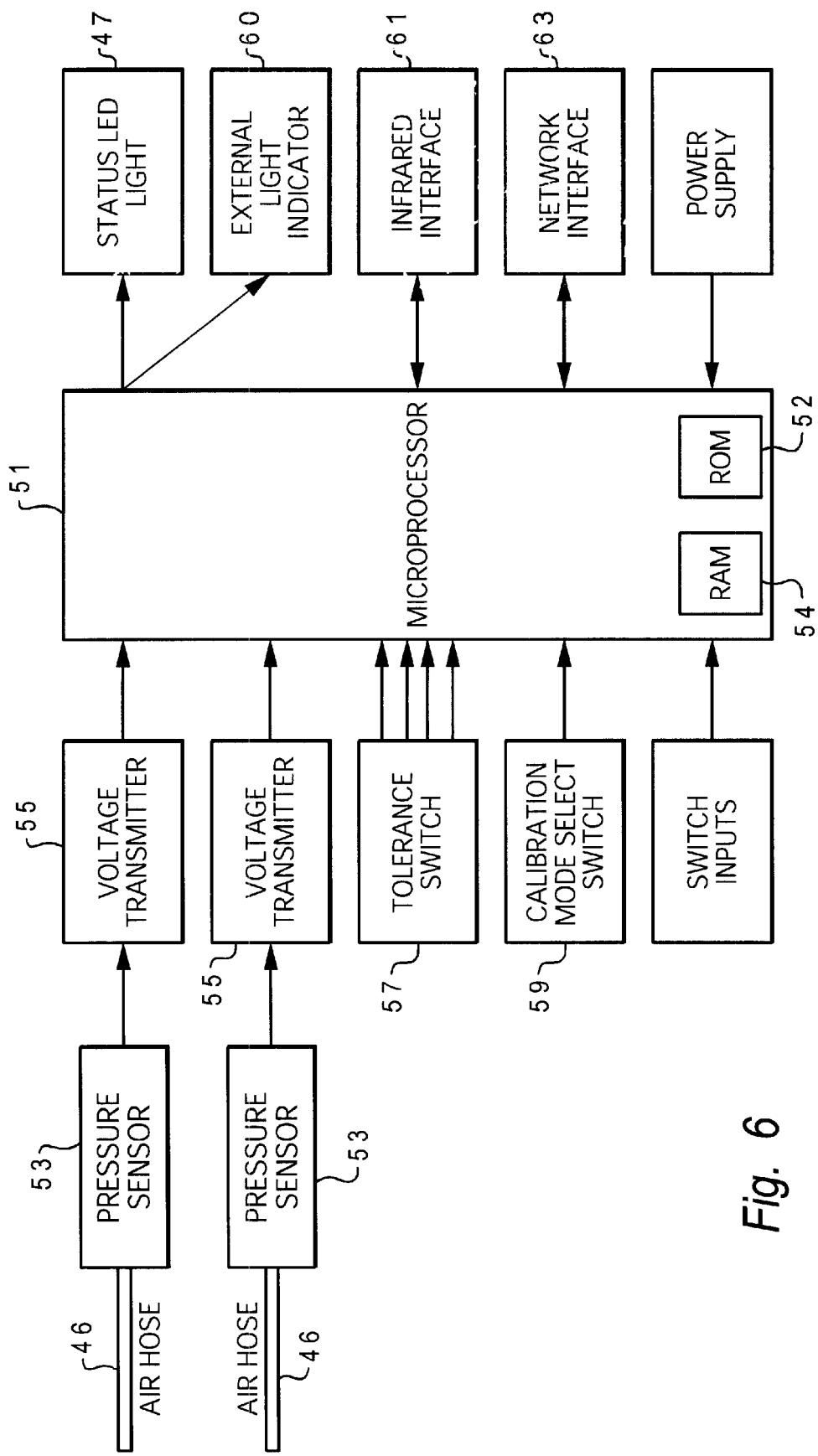
FIG. 6 is a block diagram of the apparatus.

FIG. 6 shows a block diagram of the apparatus. The apparatus includes a microprocessor 51. The microprocessor 51 has a number of inputs and outputs. The microprocessor 51 has memory, such as Read Only Memory (ROM) 52 and Random Access Memory (RAM) 54. Pressure sensors 53 provide pressure signals as inputs. In the preferred embodiment, each apparatus 41 has two pressure sensors, one for each hose 27 of the pulsator 23. The pressure sensor 53 is connected to the respective hose 27 via the hose 46. The pressure signal coming out of the pressure sensor is passed through a voltage transmitter 55 which converts the signal to an appropriate voltage level to the microprocessor. Also provided as inputs are the tolerance push buttons 57. Still another input is calibration mode select switch 59. The microprocessor is also configured to provide for other switch inputs as future applications arise.

The microprocessor provides an indicator output to the light 47. It can also provide a light 60 that is remote from the apparatus unit. Such a remote light 60 is useful if the pulsator 23 is out of sight in the milking pen. The microprocessor 51 can also provide an output to an interface so that the information can be transmitted remotely, either by infrared 61 or to a computer network 63 such as in the dairy barn office.

Figure 7:
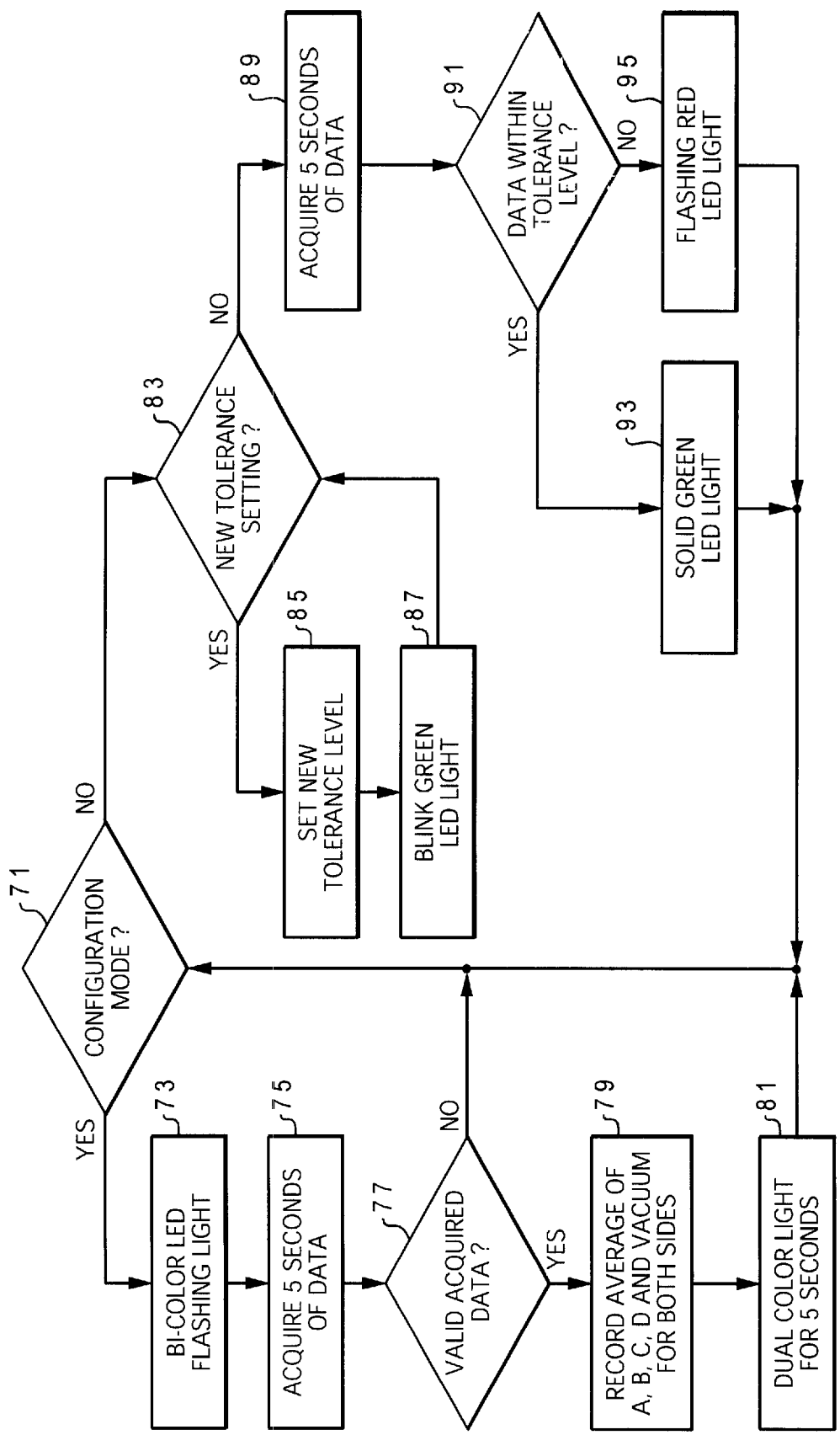
FIG. 7 is a schematic diagram of a flow chart of the method of the present invention, in accordance with a preferred embodiment.

The operation of the apparatus will now be described, with reference to FIG. 7. FIG. 7 is a flow chart having process steps that follow conventional programming shapes. A diamond shape is a decision step while a rectangular shape is a process step. The method is implemented by the microprocessor 51 in any appropriate computer language. The method can also be implemented on a variety of other types of hardware and languages.

When the apparatus 41 is turned on, the registers in the microprocessor 51 are initialized to preset settings by virtue of the ROM memory. After being initialized, the first step is to determine if the apparatus is in the configuration mode, step 71. This is done by checking the status of the calibrate switch 59. The configuration mode is used to calibrate the apparatus. One of the advantages of the apparatus 41 is that it can adapt to a specific pulsator 23. Because the pulsator 23 contains solenoids, the solenoids in one pulsator may have slightly different phase times than the solenoids in another pulsator. Thus, the method measures normal operation for a particular pulsator and uses this measurement to determine future operability of the pulsator. While the method is in the configuration mode, the first step is to provide an indication that the apparatus is indeed in the configuration mode, step 73. This is done by flashing the light 47. The light is illuminated as both red and green (orange). Thus, the operator knows that the apparatus is indeed in the configuration mode. The next step, step 75, is to acquire the pressure data from the hoses 27 over a period of time (in the preferred embodiment, data is acquired for five seconds). The data is obtained from both pressure sensors 53. In step 77, the method determines if the data is valid. This is accomplished by determining if the B and D phases of the pulsator are within preset standards (such as are listed above). This step determines if the pulsator is operating properly during calibration of the method and apparatus 41. If the data is not valid, then the method proceeds back to step 71. The method then proceeds to use the calibration data that has already been stored. If the data is valid as determined by step 77, then the method proceeds to step 79, which determines and records the average values for the A, B, C and D phases as well as the vacuum pressure. In step 81, the light 47 is turned to orange, by illuminating both the red and green colors at the same time. This indicates that valid data has been recorded. The method then returns to step 71.

If the result of step 71 is NO, then the method proceeds into data acquisition mode. In step 83, the method determines if there are any new tolerance settings. The operator provides the tolerance setting by depressing one of the push buttons 57 on the front face of the apparatus. If a push button has been depressed, then the result is YES and the method proceeds to step 85 which is to set a new tolerance level. Then the green LED light 47 is blinked for several seconds, step 87, and the method returns to step 83. If the result of step 83 is NO, then data is acquired for some period of time (in the preferred embodiment it is five seconds), step 89. Both pressure and duration are recorded.

The microprocessor 51 then determines if the acquired data is within the set tolerance of the recorded data, step 91. This is done by comparing the acquired data with the recorded data and determining if it is within the set tolerance. For example, the B phase, as measured in step 85 by the pressure sensor 53, is compared with the recorded B phase (from step 79). The comparison is made by duration of the B phase and pressure of the B phase. For example, if the measured B phase is 300 ms and the recorded B phase is 298 ms, there is a differential of 2 ms. The method determines if this differential is within the tolerance. The method performs the same determination for pressure. In addition, the method performs the same duration and pressure determinations for the D phase. If any one of the four determinations (B phase duration, B phase pressure, D phase duration, D phase pressure) is out of tolerance, then the result of step 91 is NO. Different tolerances can be provided for the duration and pressure parameters. The method actually performs this step 91 for each side (or solenoid) of the pulsator. If the data is within the tolerance, then the green light is illuminated, step 93. The method then returns to step 71. If the data is not within tolerance, then the red LED light is flashed to indicate a pulsator that is malfunctioning, step 95.

The operator in the milking pen can look at the LED 47 before hooking up the milking claw to a cow. If the green light is illuminated, then the operator is assured that the pulsator is operating correctly, and that milking claw can be utilized. If a flashing red light is shown, then the operator knows not to use that milking pen until the problem with the pulsator 23 is fixed. In many instances, the operator can fix the pulsator by merely examining it and clearing away debris from a vent port. Occasionally, a technician will have to be called to fix the pulsator. In any event, if the pulsator is malfunctioning, it will not be used on a dairy cow, subjecting that cow and many others to potential injury.

Because the apparatus and method use calibration data for the particular pulsation that is being monitored, flexibility is provided. The dairyman can adjust the pulsation rate and still maintain tight tolerances because the invention can be recalibrated to the new parameters. Also, the other phases (D & C) can be analyzed as well in step 91.

Each pulsator in the milking facility will have its own apparatus 41. In other words, a milking facility that has 60 pulsators will also have 60 of the apparatuses. Every pulsator will have a constant and wave 101 (see FIG. 4) by wave analysis against an unchanging standard. On the original setup of the invention, it will be placed into a configuration mode. The invention will be given a benchmark to compare future waves against. While in configuration mode, the invention will be given the standard by which pulsations should be compared against. Also on the original setup, the invention will be given a tolerance level. Examples of these tolerance levels are as follows: 1%, 2%, 3%, and 4%. If a tolerance level of 2% percent is chosen, any analyzed data that is at least 2% different from the benchmark wave will be thrown into an alarm status.

The present invention gives a constant analysis and a definitive "GOOD" or "BAD" as to whether each pulsator falls within the preset standards. Whether the indication is to a simple LED light, a LCD display, or a message transmitted across a computer network, no outside processing or analysis is needed for the declaration of a pulsator's status. The analysis will also be constant. At the end of each analysis cycle, an analysis will be performed. This gives the ability to the personnel in the milking facility to repair the pulsator instead of waiting for the technician.

A second unique characteristic of the invention is that its electrical power is supplied by the very component it is monitoring. The invention gains its power from the pulsator. The pulsator gets its power either from a pulsation controller or a constant power supply. If the pulsator is powered by a pulsation controller, the power is pulsating at the rate and the ratio that the controller is set at.

For example if a pulsation system is set with a rate of sixty pulsation per minute and a 60–40 milk to rest ratio, the electricity will pulse one time per second with 600 milliseconds on and 400 milliseconds off. If the pulsator is powered by a constant power supply, the power will not pulse. Taking the power from the pulsator will allow the invention to properly function without batteries, power, or data cables, which are normally supplied from a clean, dry, remote environment.

The apparatus is mounted to the top of each existing pulsator in the barn by a light gauge steel bracket placed at an approximate 45 degree angle from the pulsator. This allows the broad face of the invention to be viewed from below as the vast majority of pulsators are mounted between 8 and 12 feet above the floor of the milking facility. The angle on the bracket allows the milking technician to view the LED light so that he may view the status of each pulsator.

The apparatus' mounting bracket also serves as an electrical conductor for the negative power of the supply current by attaching underneath the negative terminal of the pulsator. This in effect completes the electrical circuit from the pulsator to the invention.

The foregoing disclosure and the showings made in the drawings are merely illustrative of the principles of this invention and are not to be interpreted in a limiting sense.

What is claimed is:

1. A method of monitoring the operation of a pulsator in a dairy barn milking system, the milking system having a milking claw with a milk line vacuum and a pulsation vacuum applied to the milking claw, the pulsator producing pressure changes in the pulsation vacuum applied to the milking claw, comprising the steps of:
   a) providing stored pressure changes of a normally operating pulsator;
   b) measuring the pressure changes in the pulsation vacuum that are produced by the pulsator;
   c) comparing the measured pressure changes to the stored pressure changes and determining if the measured pressure changes are within a predetermined tolerance of the stored pressure changes;
   d) providing an unsatisfactory indication if the measured pressure changes are outside of the predetermined tolerance.

2. The method of claim 1 further comprising the step of providing a satisfactory indication if the measured pressure changes are within the predetermined tolerance by illuminating a light of a first color in a milking pen having the milking claw and the step of providing an unsatisfactory indication further comprises the step of illuminating a light of a second color in the milking pen.

3. The method of claim 1 wherein the step of providing stored pressure changes from a normally operating pulsator further comprises the step of performing a calibration mode by measuring the pressure changes of the pulsator that is to be monitored and storing the pressure changes.

4. The method of claim 3 wherein the pressure changes comprises a rest phase and a milking phase, the step of performing a calibration mode further comprises the step of averaging the rest phases and averaging the milk phases and storing the averaged rest phases and milk phases.

5. The method of claim 1 wherein the pressure changes comprise a rest phase and a milking phase, with the rest phase and the milking phase having a pressure and a duration, the steps of comparing and determining if the measured pressure variations are within a predetermined tolerance further comprises the step of comparing the measured rest and milk phases to the respective stored rest and milk phases and determining if the durations and pressures are within the predetermined tolerances.

6. The method of claim 1, wherein the pressure changes comprises a rest and a milking phase, with the rest phase and the milking phase having a pressure and a duration, further comprising the steps of:
   a) providing a satisfactory indication if the measured pressure changes are within the predetermined tolerance by illuminating a light of a first color in a milking pen having the milking claw and the step of providing an unsatisfactory indication further comprises the step of illuminating a light of a second color in the milking pen;
   b) the step of providing stored pressure changes from a normally operating pulsator further comprises the step of performing a calibration mode by measuring the pressure changes of the pulsator that is to be monitored and storing the pressure changes;
   c) the pressure changes comprise a rest phase and a milking phase, the steps of comparing and determining if the measured pressure variations are within a predetermined tolerance further comprises the step of comparing the measured rest and milk phases to the respective stored rest and milk phases and determining if the durations and pressures are within the predetermined tolerances.

7. An apparatus for monitoring the pulsation of a milking system in a dairy facility, the milking system comprising a milk vacuum line connected to a milking claw and a pulsation vacuum line connected to the milking claw and a pulsator for alternating the pressure in the pulsation vacuum line, comprising:

a) a pressure sensor that is structured and arranged to be coupled to the pulsation vacuum line, the pressure sensor providing a pressure signal;

b) a processor having an input and an output, the input being connected to the pressure sensor so as to receive the pressure signal, the processor having a memory, the memory containing recorded variations representing the normal operation of the pulsator, the processor comparing the pressure signal with the recorded pressure variations and determining if the pressure signal is within a predetermined tolerance of the recorded pressure variations, the processor providing a signal to the output which signal indicates if the pulsator is operating;

c) an indicator coupled to the processor output.

8. The apparatus of claim 7 wherein the processor compares duration and pressures of the pressure signal with duration and pressures of the recorded pressure variations.

9. The apparatus of claim 7 wherein the indicator is a light.

10. The apparatus of claim 7 wherein the pulsator alternates the pressure in the vacuum line between a rest phase and a milking phase, the rest phase and the milking phase each having a duration and a pressure, wherein the processor compares the duration and pressure of the rest phase of the pressure signal to the duration and pressure of the rest phase of the recorded pressure variations and compares the duration and pressure of the milking phase of the pressure signal to the duration and pressure of the milking phase of the recorded pressure variations.

11. The apparatus of claim 7 further comprising an adjustable tolerance setting that provides an adjustable input of the tolerance to the processor.

12. The apparatus of claim 7 further comprising a calibration setting that provides an input to the processor, the processor recording the recorded pressure variations from the pulsator that is being monitored when the calibration setting is selected.

13. A pulsation system for use in a dairy barn, comprising:

a) a pulsator coupled between a vacuum line and a milking claw, the pulsator providing pulsations of vacuum pressure and atmospheric pressure to the milking claw;

b) a pressure sensor that is structured and arranged to be coupled to the vacuum line, the pressure sensor providing a pressure signal;

c) a processor having an input and an output, the input being connected to the pressure sensor so as to receive the pressure signal, the processor having a memory, the memory containing recorded variations representing the normal operation of the pulsator, the processor comparing the pressure signal with the recorded pressure variations and determining if the pressure signal is within a predetermined tolerance of the recorded pressure variations, the processor providing a signal to the output which signal indicates if the pulsator is operating;

d) an indicator coupled to the processor output.

14. The method of claim 1, wherein the steps of measuring the pressure changes in the pulsation vacuum that are produced by the pulsator, comparing the measured pressure changes to the stored pressure changes and determining if the measured pressure changes are within a predetermined tolerance of the stored pressure changes and providing an unsatisfactory indication if the measured pressure changes are outside of the predetermined tolerance, are performed before applying the milking claw to each cow.

15. The apparatus of claim 7 further comprising a mount for mounting the apparatus in the dairy facility so as to continuously monitor the pulsation of the milking system.

16. A dairy barn milking facility, comprising:

a) a milk vacuum line connected to plural milking claws, each of the milking claws having at least one milking shell, each milking shell having a liner that is structured and arranged to receive a teat, each milking shell having an annulus around the liner;

b) each of the milking claws comprising:

i) a pulsation vacuum line connected to the annulus of the milking shell;

ii) a pulsator connected to the pulsation vacuum line for alternating the pressure in the annulus;

iii) a pressure sensor coupled to the pulsation vacuum line, the pressure sensor providing a pressure signal;

iv) a processor having an input and an output, the input being connected to the pressure sensor so as to receive the pressure signal, the processor having a memory, the memory containing recorded variations representing the normal operation of the pulsator, the processor comparing the pressure signal with the recorded pressure variations and determining if the pressure signal is within a predetermined tolerance of the recorded pressure variations, the processor providing a signal to the output, which signal indicates if the pulsator is operating;

v) an indicator coupled to the processor output.

17. The dairy barn of claim 16 wherein the pressure sensors and processors continuously monitor the pulsations and their respected vacuum lines.

* * * * *